United States Patent
Ogzewalla

(12) 
(10) Patent No.: US 6,355,083 B1
(45) Date of Patent: Mar. 12, 2002

(54) DUST CONTROL COMPOSITION FOR FERTILIZER AND METHOD OF TREATMENT OF FERTILIZER

(75) Inventor: Mark B. Ogzewalla, Winter Haven, FL (US)

(73) Assignee: ARR-MAZ Products, LP, Winter Haven, FL (US)

( * ) Notice: Subject to any disclaimer, the term of this patent is extended or adjusted under 35 U.S.C. 154(b) by 0 days.

(21) Appl. No.: 09/490,402

(22) Filed: Jan. 24, 2000

(51) Int. Cl.[7] .................................................. C05G 5/00
(52) U.S. Cl. ..................... 71/33; 71/34; 71/35; 71/61; 71/64.07; 252/384
(58) Field of Search ............................. 252/384, 64.07; 71/34, 33, 35, 61

(56) References Cited

U.S. PATENT DOCUMENTS

| | | | |
|---|---|---|---|
| 2,829,040 A | | 4/1958 | Darin et al. |
| 3,223,518 A | | 12/1965 | Hansen |
| 3,252,786 A | * | 5/1966 | Bozzelli et al. ............. 71/64.07 |
| 3,295,950 A | * | 1/1967 | Blouin et al. ............... 71/64.07 |
| 3,565,599 A | | 2/1971 | Sor et al. |
| 4,642,196 A | | 2/1987 | Yan |
| 4,780,233 A | | 10/1988 | Roe |
| 5,238,480 A | | 8/1993 | Rehberg et al. |
| 5,328,497 A | | 7/1994 | Hazlett |
| 5,360,465 A | | 11/1994 | Bucholz et al. |
| 5,413,856 A | | 5/1995 | Swarup et al. |
| 5,431,708 A | | 7/1995 | Lehmann et al. |
| 5,454,851 A | | 10/1995 | Zlotnikov et al. |
| 5,500,220 A | | 3/1996 | Roe et al. |
| 5,603,745 A | | 2/1997 | Pettersen et al. |
| 6,039,892 A | * | 3/2000 | Himeshima et al. ........ 252/384 |

OTHER PUBLICATIONS

Russian 1782985 published Dec. 23, 1992, (Abstract only).*
Russian 1758033 published Aug. 30, 1992, (Abstract only).*
Netherlands 130583 published Aug. 17, 1970, (Abstract only).*
Russian 1812200 published Apr. 30, 1993, (Abstract only).*
Rutland, David W., "Manual for Determining Physical Properties of Fertilizer," 2nd ed., International Fertilizer Development Center (Muscle Shoals, AL), (Jan. 2, 1993).
Mark Ogzewalla, "Fertilizer Dust & Dust Control Coating Agents," Proceedings of 45th Annual Meeting Fertilizer Industry Round Table.
ARR–MAZ Products, L.P., "Sixth Annual Granular Fertilizer Survey," ARR–MAZ Products, L.P. (Winter Haven, FL), (Jan. 14, 1996).
John O. Frick, "Petroleum Based DCA's To Control Fugitive Dust," Proceedings of the 27th Annual Meeting Fertilizer Industry Round Table 1977.

* cited by examiner

Primary Examiner—Wayne Langel
(74) Attorney, Agent, or Firm—Dennis G. LaPointe; Mason & Associates, PA

(57) ABSTRACT

A dust control composition for and method of treating fertilizer particles, the composition comprising 10–100% by weight oxidized oil, 0–90% by weight non-oxidized oil, and 0–90% by weight wax. The fertilizer particle is selected from the group consisting of ammonium phosphate, potash, granulated single super phosphate, granular triple super phosphate, NP-fertilizer and NPK-fertilizer. A preferred composition includes a composition of 30–90% by weight oxidized oil, 10–70% by weight non-oxidized oil, and 10–70% by weight wax. The oxidized oil is selected from the group consisting of corn oil, canola oil, cottonseed oil, sunflower oil, soy oil, linseed oil, castor oil, tall oil, mixtures thereof, and distillation products and distillation residues thereof. The non-oxidized oil is selected from the group consisting of white oil, refined mineral oil, vegetable oil, and mixtures thereof; and the wax is selected from the group consisting of intermediate waxes, paraffin waxes, microcrystalline waxes, carnauba waxes, vegetable waxes and mixtures thereof.

8 Claims, 9 Drawing Sheets

DUST CONTROL COMPOSITION FOR FERTILIZER AND METHOD OF TREATMENT OF FERTILIZER

BACKGROUND OF THE INVENTION

1. Field of the Invention

The present invention relates to a dust control composition for fertilizer for the purpose of reducing the dust levels present in the fertilizer, reducing subsequent dust formation, and to reduce the tendency of the fertilizer particles to agglomerate or cake during storage and transportation.

2. Description of Related Art

Methods for the manufacture of fertilizers (inorganic, organic, or micronutrient) as well as methods for processing these fertilizers into particles via prilling, granulating, compaction or other techniques are well known. The resulting fertilizers often contain an undesirable level of particles fine enough to become airborne dust. This dust is produced during the manufacture, storage and transportation of the fertilizer particles. The dust can be the result of mechanical abrasion encountered during movement of the fertilizer particles, continued chemical reactions or curing processes after the initial particle formation, the action of moisture migration through the fertilizer during storage or ambient temperature and humidity conditions.

Fertilizer dust dissemination poses safety, health, environmental, housekeeping and maintenance problems for fertilizer producers, distributors and consumers. For instance fertilizer dust has raised health concerns due to human and animal inhalation thereof. It is also a concern when fertilizer dust becomes airborne which can lead to the loss of agronomic and economic value, while potentially contributing to the contamination of surface water ecosystems.

The use of oils, waxes, blends of oil and wax, and emulsions based on these products have been known for a long time. These oils and waxes can be petroleum or vegetable based. For instance, in 1977 Frick suggested that petroleum based products be used to control dust from agricultural fertilizers, See "Petroleum Based DCA's to Control Fugitive Dust", Frick, Proceedings of the Annual Meeting of the Fertilizer Industry Round Table, Series 27, pages 94–96. However there are disadvantages involved in using these treatment methods. Over time oils tend to volatilize and/or be adsorbed into the fertilizer particle and loose their effectiveness. Waxes are also ineffective and difficult to handle because they absorb into the fertilizer particle at temperatures above their melt point and do not spread or coat the fertilizer particle surface at temperatures below their melt point. In addition, both oils and waxes have limited binding properties that are essential for long term fertilizer dust control.

Other proposed dust control methods include application of other liquids such as lignosulfonate solutions, molasses solutions, urea solutions, mixtures of these solutions, other fertilizer solutions, amines, surfactants, polymers and even water. Examples are U.S. Pat. No. 5,360,465 to Buckholtz et al. and U.S. Pat. No. 5,328,497 to Hazlett. These methods have a number of disadvantages as well. Due to the water present, aqueous solutions and emulsions tend to accelerate the formation of fertilizer dust and exacerbate the fertilizer particles caking tendencies. These treatments also tend to loose their binding properties as the solutions and emulsions dry, thereby becoming ineffective as long term dust control agents.

European Patent 0320987 discloses the use of a conditioning agent comprising 10–60% wax, 30–90% oil and 0.3–10% by weight of a high-molecular weight viscoelastic elastomer such as polyisobutylene. U.S. Pat. No. 5,603,745 to Pettersen et al. discloses the use of a conditioning agent comprising 10–50% wax, 40–90% oil and 1–30% of a oil soluble and wax miscible resin such as esters of polymerized resin, esters of stabilized resin acids or non-crystallized tall oil resin. While these conditioning agents provided an improvement in dust control over oils, waxes, and oil/wax blends, they do not provide the degree of binding required for effective long-term dust control. This is because the majority of these conditioning agents still consist of poor performing oils and waxes.

The vast majority of commercially produced fertilizers are treated with a conditioning agent of some type to reduce dust levels. For instance, in 1995 Ogzewalla suggested several characteristics needed for an effective dust control conditioning agent in "Fertilizer Dust and Dust Control Coating Agents", Ogzewalla, Proceedings of the Annual Meeting of the Fertilizer Round Table, $45^{th}$ Meeting, 1995, pages 95–100. These characteristics included the ability to bind dust back to the surface of the fertilizer granule, resist absorption into the fertilizer granule surface, and the ability to spread or coat the fertilizer granule surface. The example given in this article shows that several commercially available conditioning agents were able to reduce dust levels in a diammonium phosphate fertilizer from 600 ppm to between 170–70 ppm. In addition, the "Sixth Annual 1996 Granular Fertilizer Survey", 1996, ARR-MAZ Products, L.P., shows the dust levels found in twenty two samples of diammonium phosphate collected from fertilizer production facilities across North America. The producers, during manufacture, had treated all of these fertilizer samples with a conditioning agent. Dust levels were shown to range from 425 ppm to 55 ppm and averaged 125 ppm.

One of the main objectives of the invention was to develop a superior agricultural composition comprising of fertilizer particles having low dust levels and a reduced tendency to cake during the long term storage and handling conditions normally encountered by commercial fertilizer products. Another objective was to develop a superior conditioning agent that is fluid at application temperatures and can be applied by conventional coating or conditioning equipment. A further objective was to arrive at a conditioning agent that would not effect the fertilizers handling characteristics or flowability.

SUMMARY OF THE INVENTION

The main problem to be solved was to obtain a superior conditioning or dust control agent that is fluid and flexible enough to spread over the surface of the fertilizer granules during the coating process, and yet still had enough binding properties to adhere ambient dust to the surface of the granule and reduce dust formation during subsequent storage and handling. Further, it was important that the resulting treated fertilizer granules can not become too sticky for handling by conventional means, even when treated at relatively high application rates. In addition, the resultant conditioning agent should be easy to apply on the fertilizer particles and be non-toxic to the soil and plants. This latter requirement implies that the various components must be environmentally acceptable. It is also desirable that the conditioning of the fertilizer particles be accomplished in one step with the required protection obtained during this step. A further requirement was that the treated fertilizer be completely soluble a few days after to the soil, and that the conditioning agent be degradable in the soil.

In view of the above stated requirements, an investigation was started for an improved conditioning or dust control agent by studying ways to improve the properties of the oils and waxes used as major components of the most common conditioning agents. Both petroleum and vegetable based oils and waxes have some value in these conditioning agent formulations. The effectiveness of any specific oil was found to be determined by the oils physical properties, in particular the combination of viscosity and tackiness. Accordingly, this component, the oil/wax, could be substituted with a new component, another oil/wax, having somewhat different properties. Further investigation showed that selection of optimal components could be of importance.

The search for optimal components resulted in investigation of methods that could change or modify these components. The selection of a vegetable oil or wax and then subjecting this vegetable oil or wax to an oxidation process was found to have a measurable effect on reducing fertilizer dust and dust formation.

Typical examples of materials which can be oxidized and used as starting points for the oxidized component include, but are not limited to, crude oils such as corn oil, canola oil, cottonseed oil, sunflower oil, soy oil, linseed oil, castor oil, and tall oil as well as their distillation products and distillation residues such as distilled tall oil, tall oil pitch and tall oil bottoms or mixtures thereof.

The compounding or mixing of lower viscosity oils or waxes into the oxidized oil are useful, but not required, to standardize the physical properties of the finished conditioning agent such as viscosity, melt point and tackiness. This insures that the conditioning agent has the desired properties at application temperatures which provide for improved dust control abilities and also allows for application by conventional coating or conditioning equipment.

Non-oxidized oils useful for compounding with the oxidized oils include, but are not limited to, white oil, refined mineral oils, and vegetable oils such as corn oil, canola oil, cottonseed oil, sunflower oil, soy oil, linseed oil, castor oil and tall oil. Oils having moderate viscosity, low volatility, and high flash point are preferred.

Waxes useful for compounding with the oxidized oils include but are not limited to intermediate waxes, paraffin waxes, micro-crystalline waxes, carnauba wax, vegetable waxes and mixtures thereof. Waxes with low congealing points are preferred for low temperature applications, while waxes with high congealing points can be useful in high temperature applications.

The oxidized oil component of the novel conditioning agent must be soluble or miscible with the oil and/or wax components. Further, it must result in a coating with the viscosity and tackiness required for dust control while maintaining the fluidity required ease of application. The resulting coating should control ambient dust levels, reduce dust formation and reduce caking tendencies without adversely effecting the fertilizers handling characteristics. These components should also be environmentally acceptable and degrade in the soil as explained above. Within this framework, it was then found that effective relative amounts in weight % of these components should be:

Oxidized Oil: 10–100%, preferably 30–90% typically

Oil: 0–90%, preferably 10–70% typically

Wax: 0–90%, preferably 10–70% typically

The present invention is therefore a dust control composition for fertilizer particles, the composition comprising 10–100% by weight oxidized oil, 0–90% by weight non-oxidized oil, and 0–90% by weight wax. The fertilizer particle is selected from the group consisting of ammonium phosphate, potash, granulated single super phosphate, granular triple super phosphate, NP-fertilizer and NPK-fertilizer.

In a typical preferred application, the composition comprises 30–90% by weight oxidized oil, 10–70% by weight non-oxidized oil, and 10–70% by weight wax.

The oxidized oil is selected from the group consisting of corn oil, canola oil, cottonseed oil, sunflower oil, soy oil, linseed oil, castor oil, tall oil, mixtures thereof, and distillation products and distillation residues thereof; the non-oxidized oil is selected from the group consisting of white oil, refined mineral oil, vegetable oil, and mixtures thereof; and the wax is selected from the group consisting of intermediate waxes, paraffin waxes, micro-crystalline waxes, carnauba waxes, vegetable waxes and mixtures thereof.

The present invention is also a method of controlling dust from fertilizer particles which comprises treating the fertilizer particles with a composition as described above.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

As noted above, the oxidized oil component of the novel conditioning and dust control agent must be soluble or miscible with the oil and/or wax components, if they are to be used. Further, it must result in a coating with the viscosity and tackiness required for dust control while maintaining the fluidity required ease of application. The resulting coating should control ambient dust levels, reduce dust formation and reduce caking tendencies without adversely effecting the fertilizers handling characteristics. These components should also be environmentally acceptable and degrade in the soil as explained above. Within this framework, it was then found that effective relative amounts in weight percent of these components is in the following range:

Oxidized Oil: 10–100%, preferably 30–90% typically

Oil: 0–90%, preferably 10–70% typically

Wax: 0–90%, preferably 10–70% typically

The invention can be further explained by reference to the below described examples.

EXAMPLE 1

Figure 1:
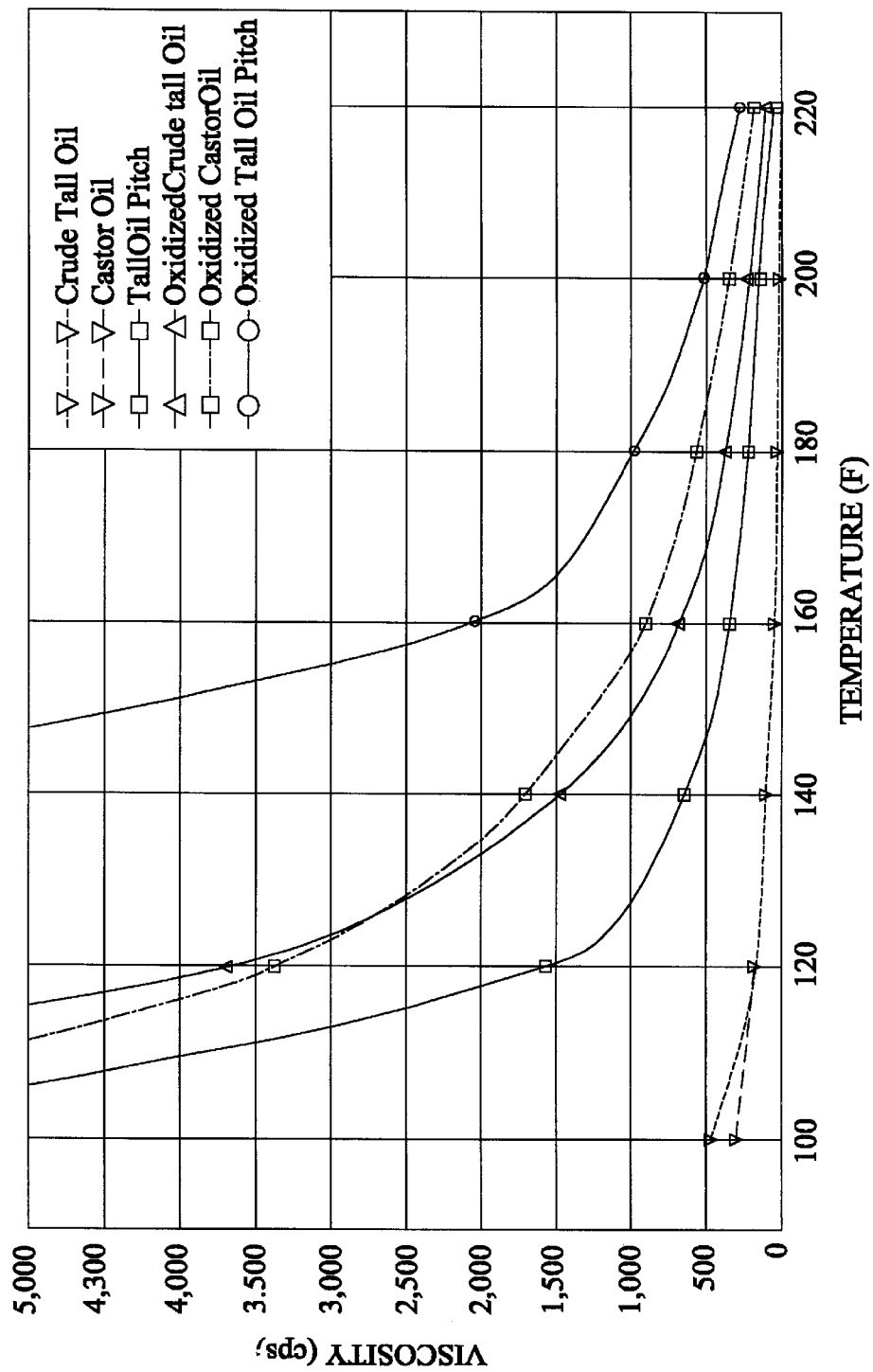
FIG. 1 is a graphic representation of viscosity of oils before and after oxidation.

This example demonstrates the effect that oxidation can have on the viscosity of oils and waxes. The results of this experiment are shown in FIG. 1 and Table 1.

TABLE 1

Effect of Oxidation on Viscosity

| Temp. (° F.) | Castor Oil | Oxidized Castor Oil | Crude Tall Oil | Oxidized Crude Tall Oil | Tall Oil Pitch | Oxidized Tall Oil Pitch |
| --- | --- | --- | --- | --- | --- | --- |
| 100 | 270 | 7,725 | 431 | 11,700 | 6,912 | |
| 120 | 142 | 3,350 | 137 | 3,665 | 1,540 | 46,000 |
| 140 | 79 | 1,650 | 75 | 1,452 | 635 | 8,662 |
| 160 | 48 | 875 | 44 | 644 | 316 | 2,010 |
| 180 | 33 | 514 | 27 | 322 | 175 | 945 |
| 200 | 21 | 320 | 19 | 177 | 110 | 488 |
| 220 | 17 | 185 | 15 | 108 | 71 | 257 |

Samples of castor oil, crude tall oil and tall oil pitch, were oxidized by heating in an agitated reaction flask to 450° F. Oxygen was introduced into the bottom of the reaction flask through a fritted glass dispersion tube. The application of heat, agitation and oxygen was continued until the desired level of oxidation was obtained. Catalysts can be used to speed the reaction, reduce the reaction temperature, or reduce the time required to obtain the desired level of oxidation.

The time to carry out the oxidation process is highly dependent on the oil or wax used as a starting point and the conditions under which the reaction is carried out. Increasing the reaction temperature and/or pressure will increase the reaction rate and reduce the reaction time. Initiators, catalysts or other materials can also be used to increase the reaction rate. Because they speed up the reaction rate, these materials can be used to either decrease the reaction time or to decrease the reaction temperature and/or pressure. Potassium permanganate, potassium dichromate and similar oxidizing catalysts are examples of effective catalysts. The oxidation process is carried out until the oil develops the desired final properties or until there is no longer any change in the oil's properties. The desired final properties include but are not limited to color, viscosity, specific gravity, and tackiness. In practice, the variables of time, temperature, pressure and the use of initiators or other materials are manipulated to produce the desired finished product at the lowest economic cost. Similarly, because of economic and other considerations, the properties of the finished product will vary depending on the oil or wax used as the starting point.

In this example and those that follow, the viscosity of each sample was determined with a Brookfield DV-I +viscometer with a Brookfield Thermosel temperature controller. The viscosity of these oils is substantially increased as can be seen in FIG. 1. The increased viscosity results in reduced penetration or adsorption into the fertilizer granule surface. This leaves more material on the fertilizer granule surface where it can act to reduce dust levels and prevent dust formation. This increase in viscosity is also accompanied by an increase in tackiness, which improves the materials ability to reduce dust and prevent dust formation.

EXAMPLE 2

Figure 2A:
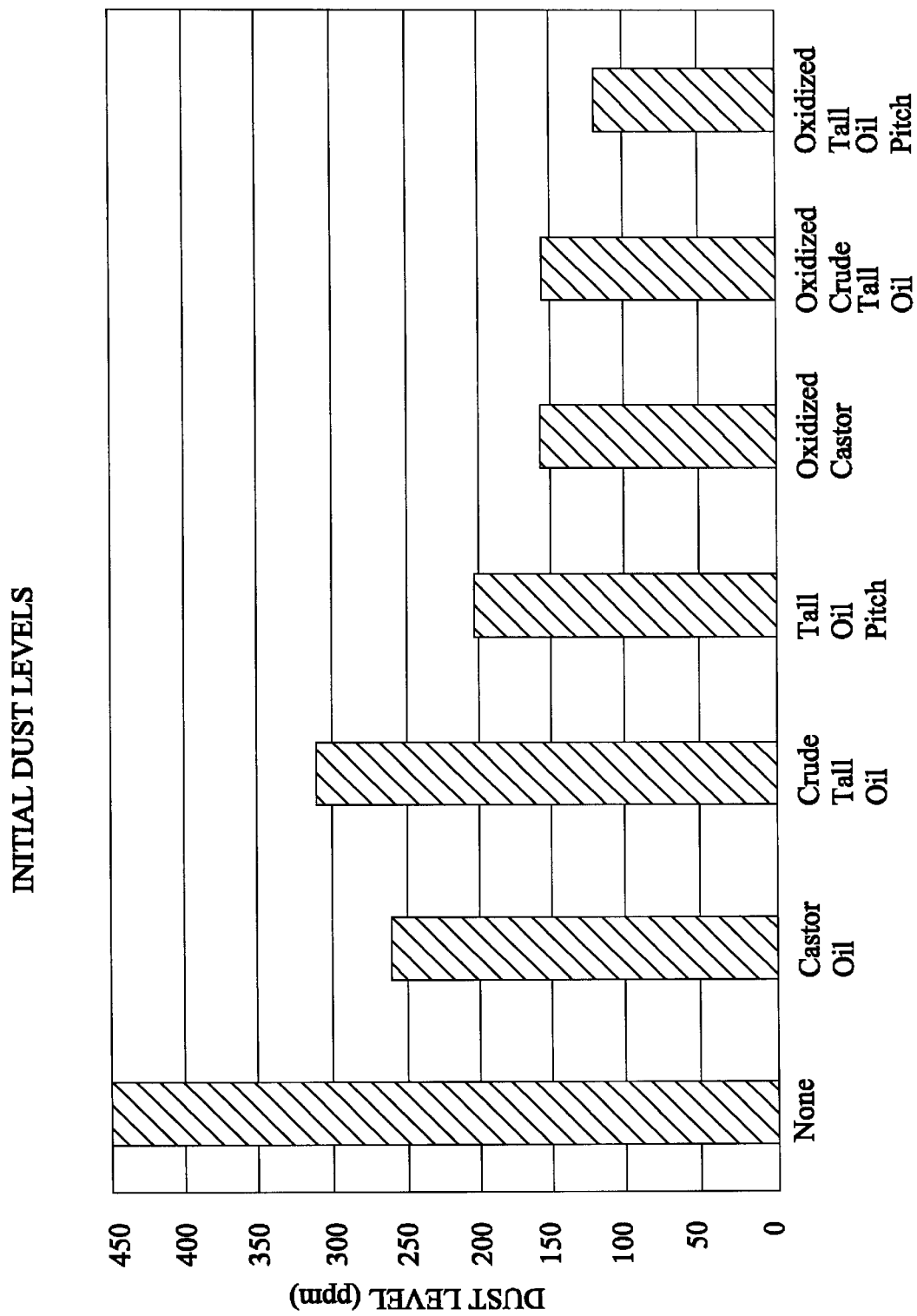
FIG. 2a is a graphic representation of initial dust tests comparing oils before and after oxidation.
Figure 2B:
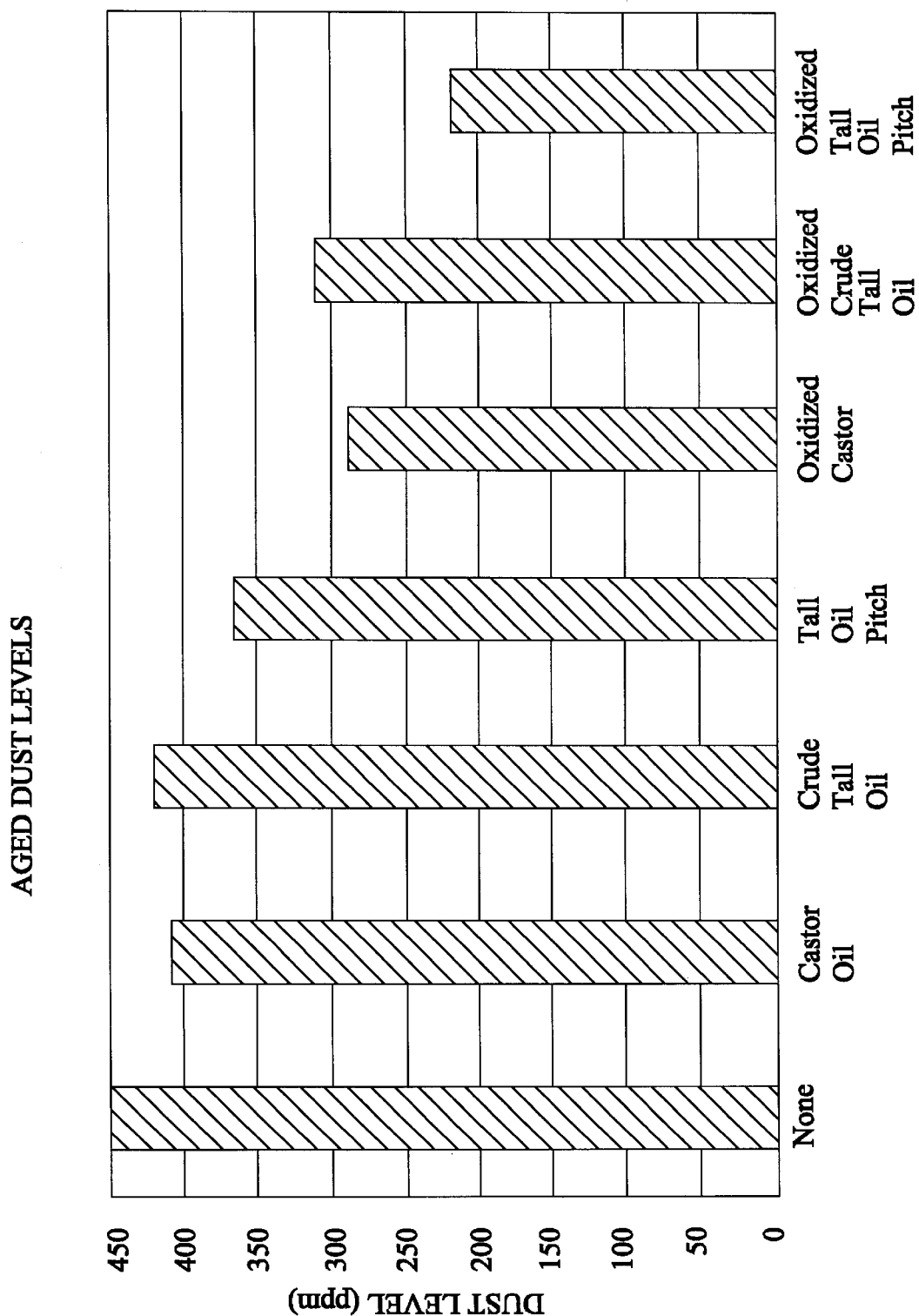
FIG. 2b is a graphic representation of aged dust tests comparing oils before and after oxidation.

This example demonstrates the improvement in dust control and dust prevention obtained by using oxidized oils or waxes as conditioning and dust control agents. The results of this experiment are shown in FIG. 2a, FIG. 2b and Table 2.

TABLE 2

| Treatment Type | Application Rate (%) | Dust Level Initial Test | Dust Level Aged Test |
| --- | --- | --- | --- |
| None | 0.00 | 1,065 | 1,135 |
| Castor Oil | 0.15 | 260 | 405 |
| Crude Tall Oil | 0.15 | 310 | 420 |
| Tall Oil Pitch | 0.15 | 203 | 365 |
| Oxidized Castor | 0.15 | 160 | 285 |
| Oxidized Crude Tall Oil | 0.15 | 160 | 310 |
| Oxidized Tall Oil Pitch | 0.15 | 125 | 220 |

Commercial diammonium phosphate fertilizer granules were treated with six conditioning agents comprised of the following: 100% castor oil; 100% crude tall oil; 100% tall oil pitch; 100% oxidized castor oil; 100% oxidized crude tall oil; and 100% oxidized tall oil pitch. Application rate of the composition was 0.15% by weight of the fertilizer. Dust levels were then determined using a dust tower similar to that described in the "Manual For Determining Physical Properties of Fertilizer," 2nd Edition, 1993, International Fertilizer Development Center, Muscle Shoals, Alabama, at pages 69–72, in which the fertilizer particles are passed through a counter current stream of air and are agitated as they pass through a series of grates. The dust particles are collected on a filter. Dust levels were determined after initial treatment with these conditioning agents. As can be seen from FIG. 2a the oxidation process significantly improves the conditioning agent's ability to control the dust levels normally found in fertilizers.

Another series of commercial diammonium phosphate fertilizer granules were treated with the same series of conditioning agents and application rates as listed above. These samples were allowed to aged in a 140° F. oven for 14 days. After removal from the oven the samples were allowed to cool for 24 hrs. This aging process is designed to simulate the increase in dust levels normally encountered during the storage of fertilizer granules. Dust levels were then determined using the dust tower. As can be seen from FIG. 2b the oxidation process significantly improves the conditioning agent's ability to control dust, which normally forms during fertilizer storage.

EXAMPLE 3

Figure 3A:
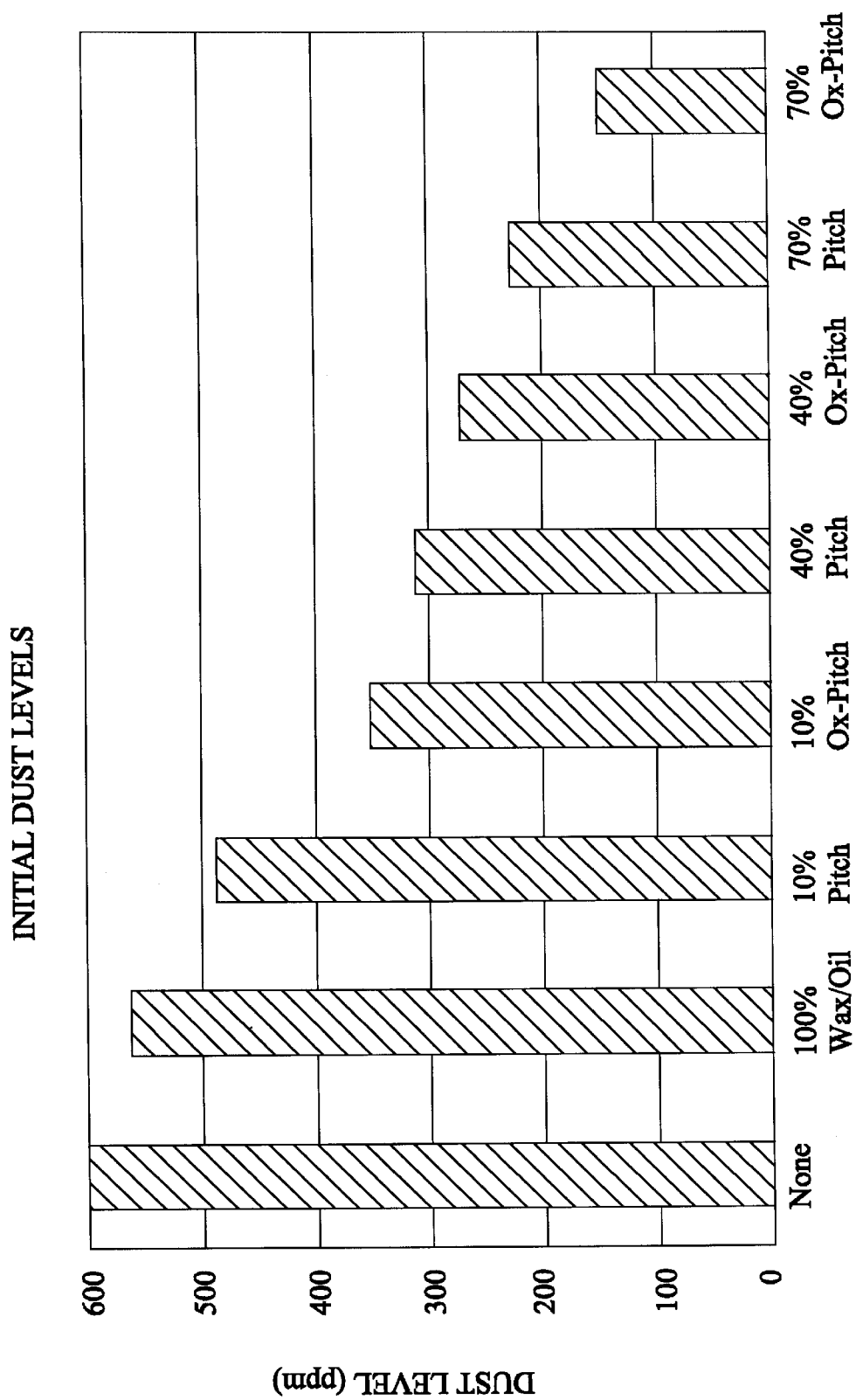
FIG. 3a is a graphic representation of initial dust tests with various levels of oxidized pitch.
Figure 3B:
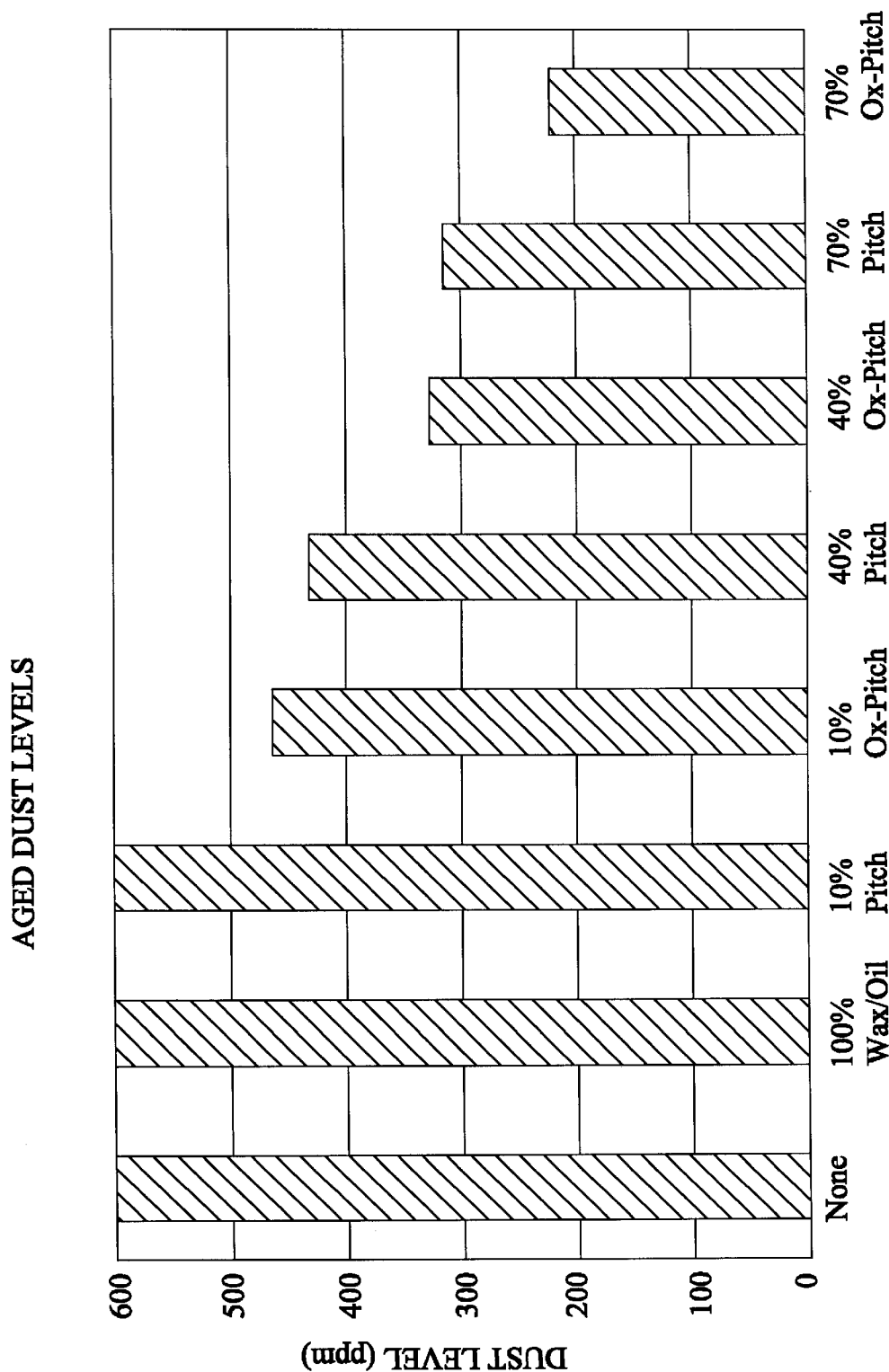
FIG. 3b is a graphic representation of aged dust tests with various levels of oxidized pitch.

This example demonstrates the improvement in dust control and dust prevention obtained by formulating a dust control composition comprising 10–100% by weight of an oxidized oil or wax, 0–90% by weight of non-oxidized oil and 0–90% by weight non-oxidized wax. The results of this experiment are shown in FIG. 3a, FIG. 3b and Table 3. Commercial diammonium phosphate fertilizer granules were treated with seven conditioning agents or compositions comprised of the following:

1) 50% by weight white oil and 50% by weight micro-crystalline wax;
2) 10% by weight tall oil pitch, 45% by weight white oil and 45% by weight micro-crystalline wax;
3) 40% by weight tall oil pitch, 30% by weight white oil and 30% by weight micro-crystalline wax;
4) 70% by weight tall oil pitch, 15% by weight white oil and 15% by weight micro-crystalline wax;

5) 10% by weight oxidized tall oil pitch, 45% by weight white oil and 45% by weight micro-crystalline wax;
6) 40% by weight oxidized tall oil pitch, 30% by weight white oil and 30% by weight micro-crystalline wax; and
7) 70% by weight oxidized tall oil pitch, 15% by weight white oil and 15% by weight micro-crystalline wax.

TABLE 3

| Treatment Type | Application Rate (%) | Dust Level | |
|---|---|---|---|
| | | Initial Test | Aged Test |
| None | 0.00 | 935 | 1073 |
| 100% Wax/Oil | 0.15 | 560 | 804 |
| 10% Pitch | 0.15 | 475 | 685 |
| 10% Ox. Pitch | 0.15 | 345 | 458 |
| 40% Pitch | 0.15 | 310 | 441 |
| 40% Ox. Pitch | 0.15 | 255 | 332 |
| 70% Pitch | 0.15 | 235 | 313 |
| 70% Ox. Pitch | 0.15 | 145 | 216 |

Application of the conditioning agent or composition was approximately 0.15% by weight of the fertilizer, the acceptable range typically being between 0.01% by weight to 2% by weight of the composition with the fertilizer substrate. Dust levels were then determined using the dust tower after initial treatment with these conditioning agents. As can be seen from FIG. 3a, the oxidation process improves the conditioning agent's ability to control the dust levels normally found in fertilizers.

Another series of commercial diammonium phosphate fertilizer granules were treated with the same series of conditioning agents and at the same application rate listed above. These samples were allowed to be aged in a 140° F. oven for 14 days. After removal from the oven the samples were allowed to cool for 24 hours. This aging process is designed to simulate the increase in dust levels normally encountered during the storage of fertilizer granules. Dust levels were then determined using the dust tower. As can be seen from FIG. 3b, the oxidation process improves the composition's ability to control the dust, which normally forms during fertilizer storage.

EXAMPLE 4

Figure 4A:
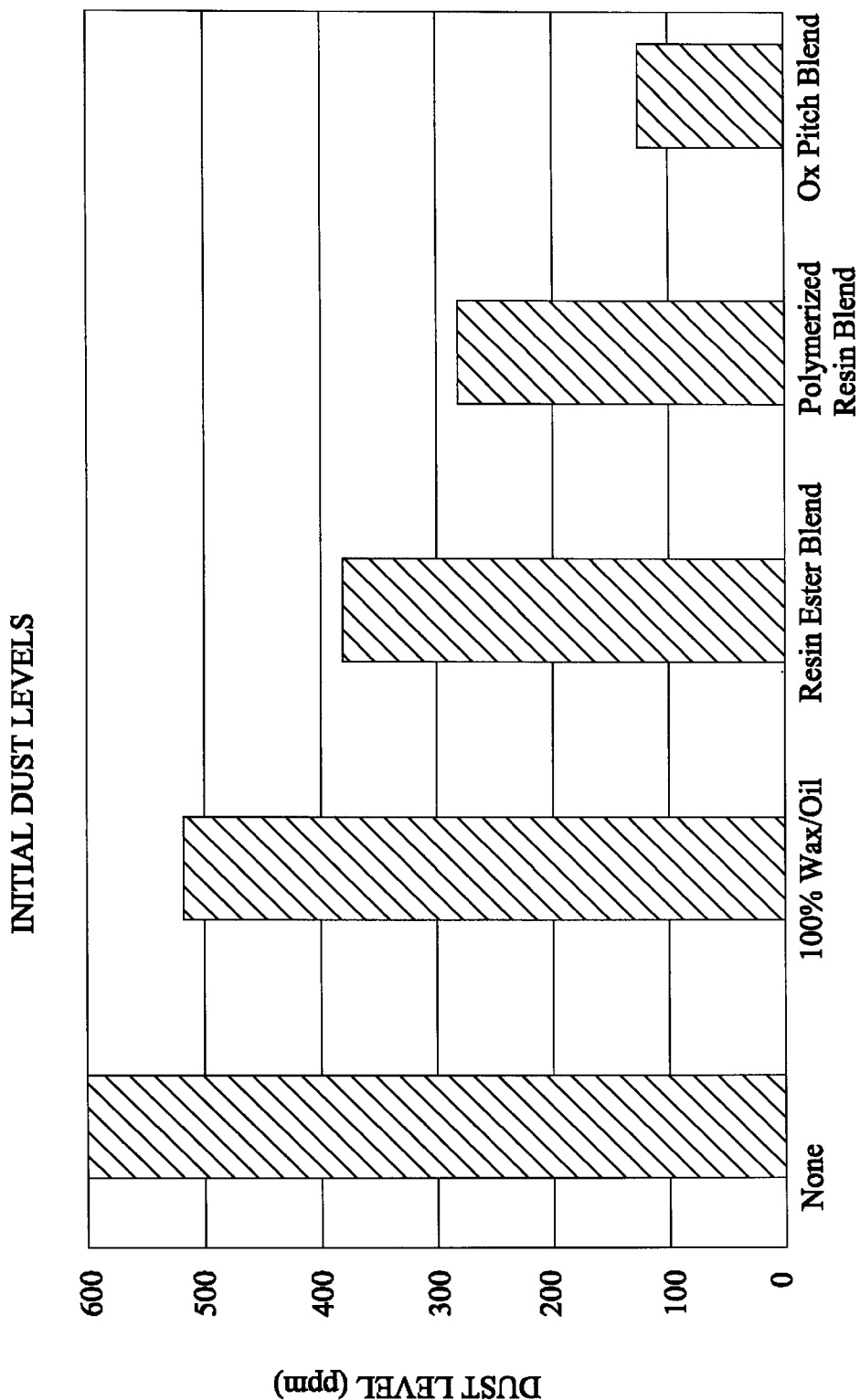
FIG. 4a is a graphic representation of initial dust tests comparing an oxidized pitch based conditioning agent with agents described by Petterson et al. in U.S. Pat. No. 5,603,745.
Figure 4B:
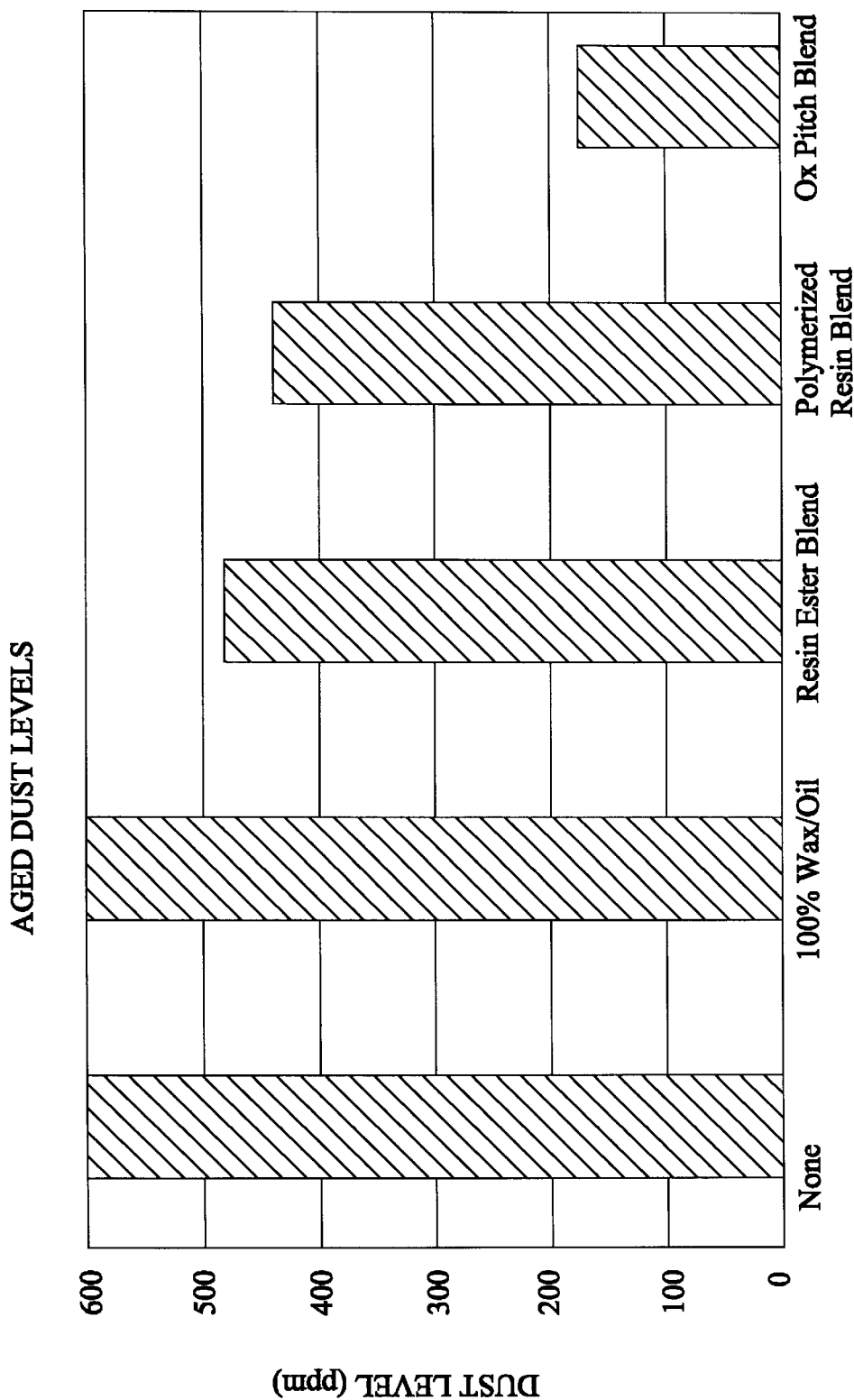
FIG. 4b is a graphic representation of aged dust tests comparing an oxidized pitch based conditioning agent with agents described by Petterson et al. in U.S. Pat. No. 5,603,745.

This example demonstrates the improvement in dust control and dust prevention obtained by a composition comprising 30–90% by weight of an oxidized oil or wax, 10–70% by weight oil and 10–70% by weight wax compared to conditioning agents described by Petterson et al in U.S. Pat. No. 5,603,745. The results of this experiment are shown in FIGS. 4a and 4b, and Table 4. Commercial diammonium phosphate fertilizer granules were treated with compositions comprised of the following:

1) 50% by weight white oil and 50% by weight micro-crystalline wax;
2) 8% by weight resin ester, 55% by weight white oil, and 37% by weight micro-crystalline wax;
3) 8% by weight polymerized resin, 55% by weight white oil, and 37% by weight micro-crystalline wax; and
4) 40% by weight oxidized tall oil pitch, 30% by weight white oil, and 30% by weight micro-crystalline wax.

TABLE 4

| Treatment Type | Application Rate (%) | Dust Level | |
|---|---|---|---|
| | | Initial Test | Aged Test |
| None | 0.00 | 965 | 1017 |
| 100% Wax/Oil | 0.15 | 520 | 697 |
| Resin Ester Blend | 0.15 | 375 | 488 |
| Polymerized Resin Blend | 0.15 | 273 | 446 |
| Ox. Pitch Blend | 0.15 | 133 | 169 |

Application of the composition was about 0.15% by weight of the fertilizer. Dust levels were then determined using the dust tower. Dust levels were determined after initial treatment with these conditioning agents. As can be seen from FIG. 4a, the oxidized oil based composition can control the dust levels normally found in fertilizers and shows an improvement over the Petterson et al. formulations.

Another series of commercial diammonium phosphate fertilizer granules were treated with the same series of conditioning agents and at the same application rate listed above. These samples were allowed to be aged in a 140° F. oven for 14 days. After removal from the oven the samples were allowed to cool for 24 hours. This aging process is designed to simulate the increase in dust levels normally encountered during the storage of fertilizer granules. Dust levels were then determined using the dust tower. As can be seen from FIG. 4b, the oxidation process improves the composition's ability to control the dust, which normally forms during fertilizer storage and shows an improvement over the Petterson et al. formulations.

EXAMPLE 5

Figure 5A:
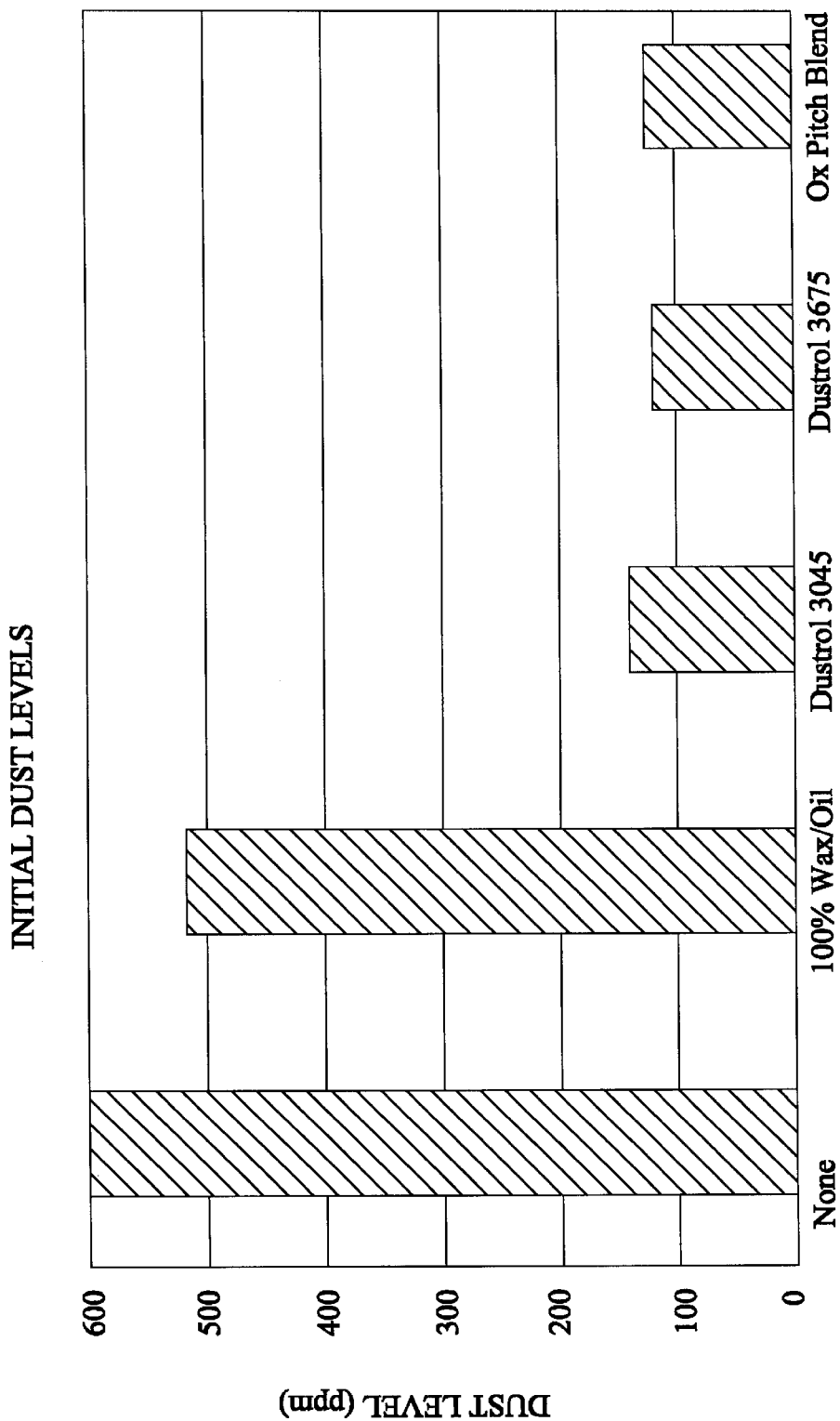
FIG. 5a is a graphic representation of initial dust tests comparing an oxidized pitch based conditioning agent with two commercial preparations.
Figure 5B:
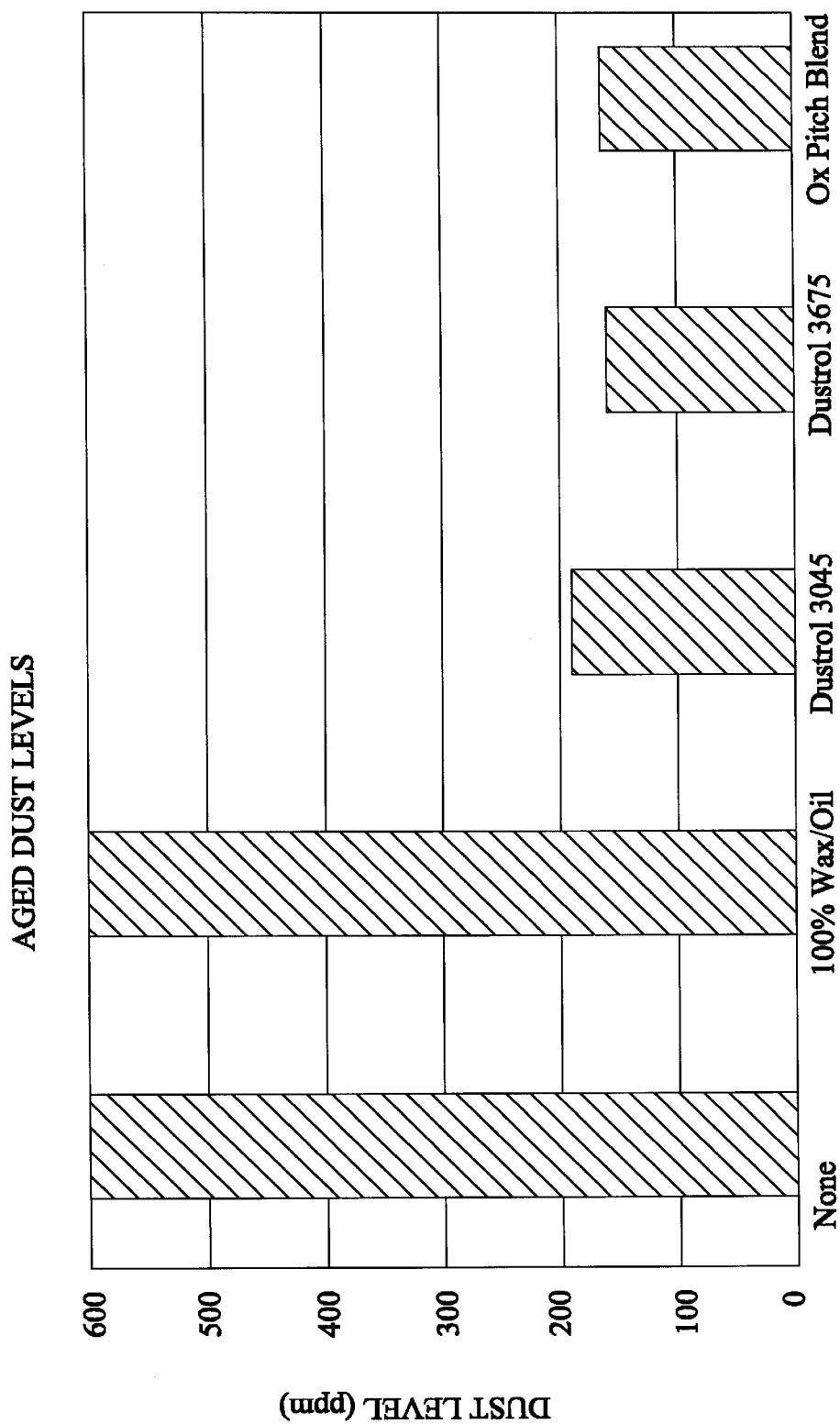
FIG. 5b is a graphic representation of aged dust tests comparing an oxidized pitch based conditioning agent with two commercial preparations.

This example demonstrates the improvement in dust control and dust prevention obtained by a conditioning agent comprising 30–90% by weight of an oxidized oil or wax, 10–70% by weight oil and 10–70% by weight wax compared to two commercial conditioning agents manufactured by ARR-MAZ Products, LP. The results of this experiment are shown in FIGS. 5a and 5b, and Table 5. Commercial diammonium phosphate fertilizer granules were treated with conditioning agents comprised of the following:

1) 50% by weight white oil and 50% by weight micro-crystalline wax;
2) 70% by weight oxidized tall oil pitch, 15% by weight white oil, and 15% by weight micro-crystalline wax;
3) DUSTROL® 3045; and
4) DUSTROL® 3675.

TABLE 5

| Treatment Type | Application Rate (%) | Dust Level | |
|---|---|---|---|
| | | Initial Test | Aged Test |
| None | 0.00 | 965 | 1017 |
| 100% Wax/Oil | 0.15 | 520 | 697 |
| DUSTROL 3045 | 0.15 | 146 | 195 |

TABLE 5-continued

| Treatment Type | Application Rate (%) | Dust Level Initial Test | Dust Level Aged Test |
|---|---|---|---|
| DUSTROL 3675 | 0.15 | 127 | 164 |
| Ox. Pitch Blend | 0.15 | 133 | 169 |

The Dustrol® products are proprietary mixtures of high viscosity petroleum oils, waxes and petroleum resins manufactured by ARR-MAZ Products, L.P., that are effective commercial dedusting agents. These products were chosen to show that the present invention is as effective as existing commercially successful products available for dust control application. Application of the conditioning agent was about 0.15 by weight of the fertilizer. Dust levels were then determined using the dust tower. Dust levels were determined after initial treatment with these conditioning agents. As can be seen from FIG. 5a, the oxidized oil based composition can control the dust levels normally found in fertilizers and shows control levels in the range of the commercial formulations.

Another series of commercial diammonium phosphate fertilizer granules were treated with the same series of conditioning agents and at the same application rate listed above. These samples were allowed to aged in a 140° F. oven for 14 days. After removal from the oven the samples were allowed to cool for 24 hrs. This aging process is designed to simulate the increase in dust levels normally encountered during the storage of fertilizer granules. Dust levels were then determined using the dust tower. As can be seen from FIG. 5b the oxidized oil based conditioning agent can control the dust, which normally forms during fertilizer storage and shows control levels in the range of the commercial formulations.

By the present invention, a conditioning agent or composition for fertilizer and method of treatment of fertilizer has been arrived at that is effective and economical as well as environmentally friendly, and which can be handled, stored for extended periods, and applied without giving problems with regard to dust formation or caking. The new composition is easy to apply using conventional coating and/or conditioning equipment. The resulting coating on the fertilizer particles is effective in reducing dust levels, reducing dust formation and reducing the tendency to cake in fertilizers without adversely effecting the handling and dissolution characteristics of the fertilizer.

The present invention is a dust control composition for fertilizer particles which comprises 10–100% by weight oxidized oil, 0–90% by weight non-oxidized oil, and 0–90% by weight wax. This composition is applied to fertilizer particles typically selected from the group consisting of ammonium phosphate, potash, granulated single super phosphate, granular triple super phosphate, NP-fertilizer and NPK-fertilizer. When applied to the fertilizer, an effective anticipated coating of a conditioning agent or dust control composition to fertilizer particles is 0.01%–2% by weight of the dust control composition.

In a preferred embodiment of the dust control composition described above, a dust control composition preferably comprises 30–90% by weight oxidized oil, 10–70% by weight non-oxidized oil, and 10–70% by weight wax.

The dust control composition for either the general embodiment described above or the preferred embodiment includes oxidized oils wherein the oxidized oil is selected from the group consisting of corn oil, canola oil, cottonseed oil, sunflower oil, soy oil, linseed oil, castor oil, tall oil, mixtures thereof, and distillation products and distillation residues thereof. Similarly, the non-oxidized oil component is typically selected from the group consisting of white oil, refined mineral oil, vegetable oil, and mixtures thereof and the wax is selected from the group consisting of intermediate waxes, paraffin waxes, micro-crystalline waxes, carnauba waxes, vegetable waxes and mixtures thereof.

The present invention further provides a novel improved method of treating fertilizer particles using the above described dust control compositions, wherein an effective anticipated coating of a conditioning agent or dust control composition to fertilizer particles is 0.01%–2% by weight of the dust control composition.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of controlling dust from fertilizer particles which comprises treating the fertilizer particles with a dust control composition comprising 10–100% by weight oxidized oil, 0–90% by weight non-oxidized oil, and 0–90% by weight wax.

2. A method of controlling dust from fertilizer particles according to claim 1, wherein the fertilizer particle is selected from the group consisting of ammonium phosphate, potash, granulated single super phosphate, granular triple super phosphate, NP-fertilizer and NPK-fertilizer.

3. A method of controlling dust from fertilizer particles according to claim 2, wherein the composition comprises 30–90% by weight oxidized oil, 0–70% by weight non-oxidized oil, and 0–70% by weight wax.

4. A method of controlling dust from fertilizer particles according to claim 2, wherein the oxidized oil is selected from the group consisting of corn oil, canola oil, cottonseed oil, sunflower oil, soy oil, linseed oil, castor oil, tall oil, mixtures thereof, and distillation products and distillation residues thereof.

5. A method of controlling dust from fertilizer particles according to claim 2, wherein the non-oxidized oil is selected from the group consisting of white oil, refined mineral oil, vegetable oil, and mixtures thereof.

6. A method of controlling dust from fertilizer particles according to claim 2, wherein the wax is selected from the group consisting of intermediate waxes, paraffin waxes, micro-crystalline waxes, carnauba waxes, vegetable waxes and mixtures thereof.

7. A method of controlling dust from fertilizer particles according to claim 3, wherein the oxidized oil is selected from the group consisting of corn oil, canola oil, cottonseed oil, sunflower oil, soy oil, linseed oil, castor oil, tall oil, mixtures thereof, and distillation products and distillation residues thereof; the non-oxidized oil is selected from the group consisting of white oil, refined mineral oil, vegetable oil, and mixtures thereof; and the wax is selected from the group consisting of intermediate waxes, paraffin waxes, micro-crystalline waxes, carnauba waxes, vegetable waxes, and mixtures thereof.

8. A method of controlling dust from fertilizer particles according to claim 2, wherein a percent concentration by weight of the dust control composition to the fertilizer particles is 0.01%–2% by weight of the dust control composition.

* * * * *